United States Patent [19]

Grochal

[11] Patent Number: 5,506,045
[45] Date of Patent: Apr. 9, 1996

[54] COMPOSITE THERMAL INSULATION SYSTEM

[75] Inventor: Peter Grochal, Waldshut-Tiengen, Germany

[73] Assignee: STO Aktiengesellschaft, Stuhlingen, Germany

[21] Appl. No.: 321,008

[22] Filed: Oct. 6, 1994

Related U.S. Application Data

[63] Continuation of Ser. No. 999,716, Dec. 31, 1992, abandoned.

[30] Foreign Application Priority Data

Jan. 2, 1992 [DE] Germany .................. 42 00 040.8

[51] Int. Cl.$^6$ .................. B32B 5/16; E04B 1/76; E04F 13/00; F24J 2/00
[52] U.S. Cl. .................. 428/323; 52/306; 52/404.1; 428/324; 428/325; 428/327; 428/328; 428/329; 428/331; 428/411.1; 428/904.4
[58] Field of Search .................. 52/306, 404.1; 428/411.1, 323, 324, 325, 327, 328, 329, 331, 904.4

[56] References Cited

U.S. PATENT DOCUMENTS 5,016,412 5/1991 Grochal .................. 52/302

FOREIGN PATENT DOCUMENTS

| 0333145 | 9/1989 | Germany . |
|---------|--------|-----------|
| 4024308 | 2/1990 | Germany . |
| 4012333 | 6/1991 | Germany . |
| 4002518 | 8/1991 | Germany . |

OTHER PUBLICATIONS

CRC Handbook of Chemistry and Physics, pp. 4–154 to 4–159 1990 CRC Press.
Kirk–Othmer Encyclopedia of Chemical Technology, 3rd Edition, vol. 10, pp. 362–363, 396 Copyright 1980 Pub. John Wiley & Sons.
Physics, Tipler, Paul A. 1982 (2d Edition) Ch. 32 pp. 856–858 and 861.

Primary Examiner—D. S. Nakarani
Attorney, Agent, or Firm—Jacobson, Price, Holman & Stern

[57] ABSTRACT

A composite thermal insulation system particularly for installation on a building wall and having a light-absorbing outer wall surface includes an at least partially light-transmissive thermal insulation material and a light-transmissive plaster-type coating on the outside surface thereof. The total light transmission of the system is lowered in the summer season to values less than 0.2, at high solar altitude angles (greater than 60° to the vertical of the wall) by the addition to the outer plaster-type coating of powdered substances having a particle size less than 5 μm and a refractive index between 1.45 and 1.65.

4 Claims, 4 Drawing Sheets

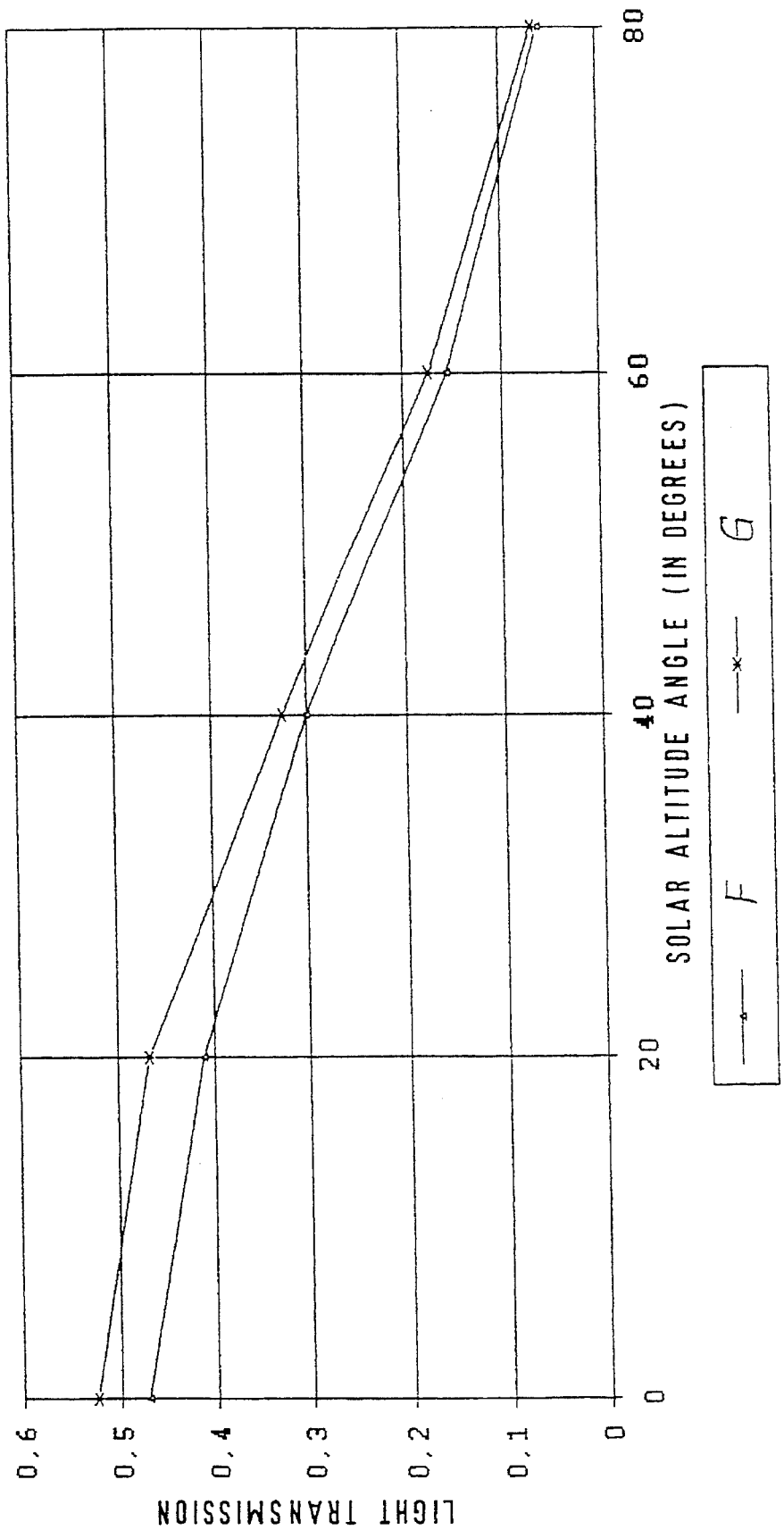

COMPOSITE THERMAL INSULATION SYSTEM

This is a continuation of application Ser. No. 07/999,716, filed Dec. 31, 1992 which was abandoned.

BACKGROUND OF THE INVENTION

The invention relates to a composite thermal insulation system, particularly for installation on a building wall, which includes a light-absorbing outer wall surface, an at least partially light-transmissive thermal insulation material, and a largely light-transmissive coating on the outside.

In a known composite thermal insulation system of this type European Patent Document EP 0 333 145A1 corresponding to U.S. Pat. No. 5,016,412 to the same applicant (incorporated herein by reference), the disadvantageous fact of frequent overheating of the rooms in the summer has been demonstrated. This is surprising, because in the summer months the sun shines on the wall at a substantially steeper (less favorable) angle, and it might have been expected that overall, a smaller quantity of radiant energy would be converted. Measurements have shown that the composite thermal insulation system has a light transmission that is dependent on the position of the sun; specifically, for the critical noontime hours in the summer months, because of the angle of the sunshine prevailing then, the light transmission drops to approximately 25 to 30%. This natural angular dependency of the transparent thermal insulation system provides a certain self-protection in the summer months. Naturally, this applies to arbitrary other locations on the globe as well. Approximately at the Equator, although the climate is warmer, the angle at which the sun shines becomes all the steeper. As the distance from the Equator increases, the climate is colder by comparison, but in that case the sunshine is at a more favorable angle in terms of radiation.

Surprisingly, it has now been discovered that this angular dependency of the transparent thermal insulation system can be varied in a favorable way by the embodiment of the outer light-transmissive coating.

BRIEF SUMMARY OF THE INVENTION

In the above referred to U.S. Pat. No. 5,016,412, the compound thermal insulating system 3 is attached to a building wall 1 having a light-absorbent exterior wall surface 2. Thermal insulating material 4, which is at least partially transparent, has a weather-resistant protective coating 5 consisting of a filler which is at least partially transparent and contains a quantity of a curing binder sufficient to produce a radiation transmission ratio for vertical sunlight of more than 20% with a coating thickness between 0.5 mm and 6 mm. Transparent reinforcement 6 is positioned between coating 5 and insulating material 4, the latter being attachable directly to the external wall surface 2 by an adhesive coating. Insulating material 4 can be attached at a distance "a" from the exterior wall surface 2 to provide an open space 8 by a support structure 7 attached to the building wall. The transparent insulating material can also be immediately adjoined to opaque insulating material 12. A continuous connection between the opaque insulating panels 12 and transparent insulating panels 4 together with reinforcement 13 covering the opaque panels may be utilized as described in said patent.

The object of the invention is to provide a composite thermal insulation system of this type in such a way that overheating of the system and of rooms is reliably avoided even in the summer.

Accordingly, the composite thermal insulation system according to the invention is distinguished in that the embodiment of the outer light-transmissive; and coating, by the addition of powdered substances having a particle size less than 5 μm and a refractive index between 1.45 and 1.65, lowers the total light transmission of the system in the summer season, at high solar altitude angles beyond 60° to the vertical of the wall, to light transmission values of less than 0.2.

Fillers that have virtually the same refractive index as the surrounding light-transmissive binder matrix, and whose particle size is less than 2.0 μm and advantageously less than 0.3 μm, are largely transparent to the light rays. Depending on the quantity used and on the particle size, they may possibly produce a slight cloudiness, which if the incident light is vertical hardly lessens the total light transmission. The especially advantageous light refraction indexes are between 1.45 and 1.65. According to the invention, it was found that by means of this provision, very effective self-protection for the light-transmissive composite thermal insulation system is attained. The angular dependency of the light shining in becomes especially pronounced as a result of this provision. At high solar altitude angles of 60° to 70°, the light transmission of the composite thermal insulation system can be lowered to approximately 0.1 to 0.2.

Fine fillers based on silicates, such as aluminum or magnesium silicates, as well as carbonates (such as silica gel, kaolin, talcum, and calcium carbonate), appear to be especially suitable.

An especially advantageous double effect is offered by fillers that not only reduce the light transmission at high angles but also improve the flame-retardant properties, for instance. These are above all compounds of phosphorus and nitrogen (such as ammonium (poly)phosphate), optionally halogenated (such as Sandoflamm 5060), and especially aluminum hydroxides.

Another variant is represented by so-called transparent pigments, which besides the important lowering of light transmission at high angles of incidence additionally produce a coloration of the light-transmissive outer coating. The invention is accordingly also directed to transparent pigments which not only reduce the light transmission but additionally have a coloring effect.

BRIEF DESCRIPTION OF THE DRAWINGS

Further details, advantages and characteristics will become apparent from the ensuing description in conjunction with the drawing, to which reference is expressly made with respect to an essential disclosure for the invention of all the details not recited in the text, and wherein:

FIG. 4 is a graph similar to FIG. 2 showing the light transmission (transparency) when fillers are added in the form of transparent pigments, as a function of the solar altitude angle (angle of inclination).

DETAILED DESCRIPTION

Figure 1:
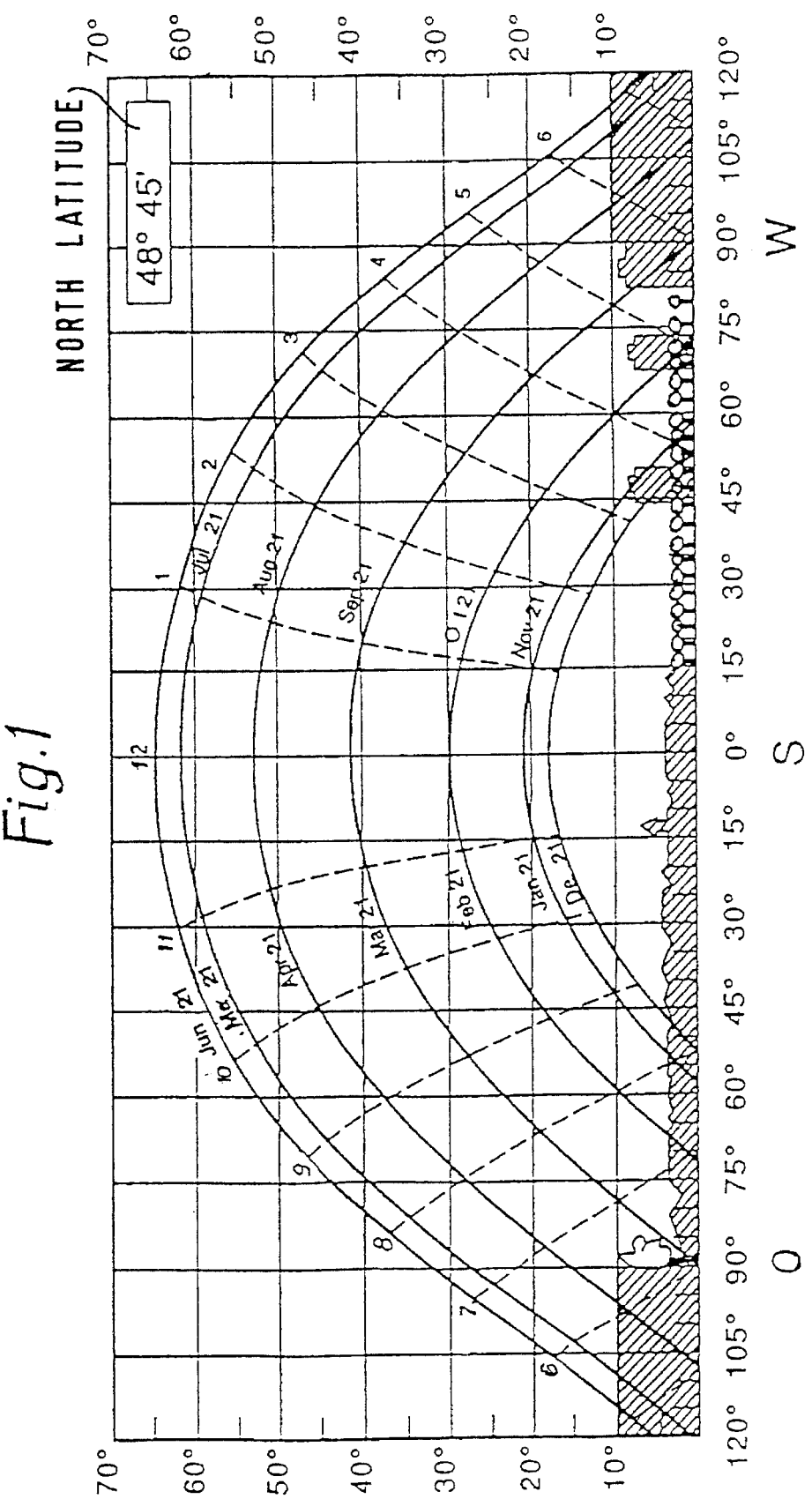
FIG. 1 is a graphical illustration of the solar altitude angle (angle of inclination) during the summer months for Stuttgart Germany.

As is known and as shown in FIG. 1, the sun in the summer months is higher in the sky and therefore shines on the wall (not shown in further detail in the drawing), which is provided with the transparent composite thermal insulation system, at an angle that is less favorable, because it is steeper. The special conditions that can be seen in the drawing apply to Stuttgart, Germany or in other words to all locations located at a north latitude of 48° 45'. As the angle becomes smaller, or in other words on approaching the Equator, the angle of incidence increases further; that is, the sun strikes the wall at a steeper angle.

Figure 2:
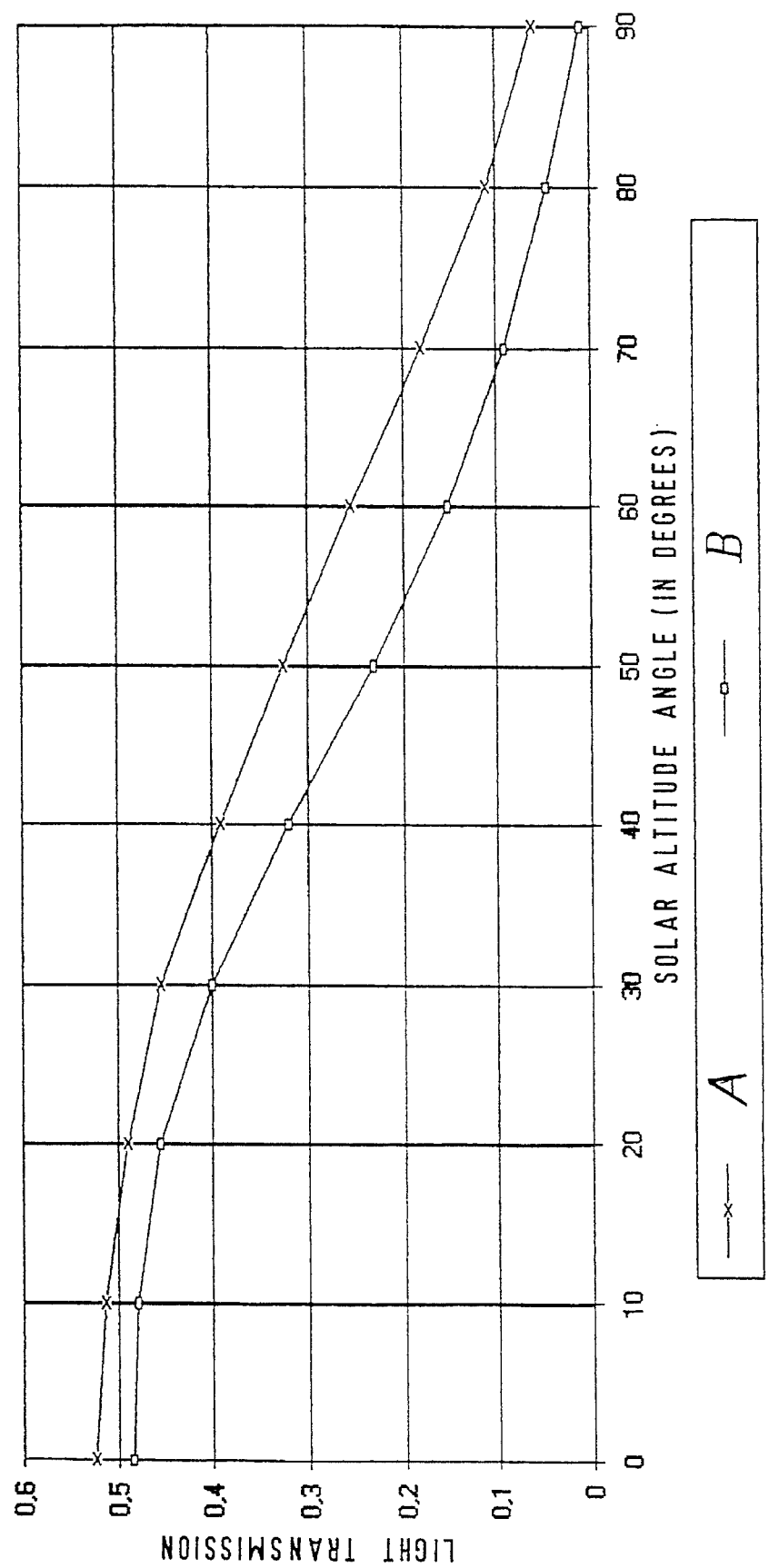
FIG. 2 is a graph showing the light transmission (transparency) of a composite thermal system, with a standard coating, compared with the modified coating that contains powdered fillers, as a function of the solar altitude angle (angle of inclination)

FIG. 2 shows that the light transmission according to the invention decreases as the angle of incidence increases. In the noontime, or in other words when the sun is high in the sky, the proportion of light passing through and converted into heat can nevertheless attain a magnitude such that unpleasant heating of the rooms results.

As a result of the addition of fillers with a small particle size, which is illustrated in terms of its effects in FIG. 2, at high angles of inclination of sunshine of approximately 60° to 70°, the light transmission is lessened quite considerably. This is clearly shown by the filler-modified coating B in comparison with the standard coating A.

Figure 3:
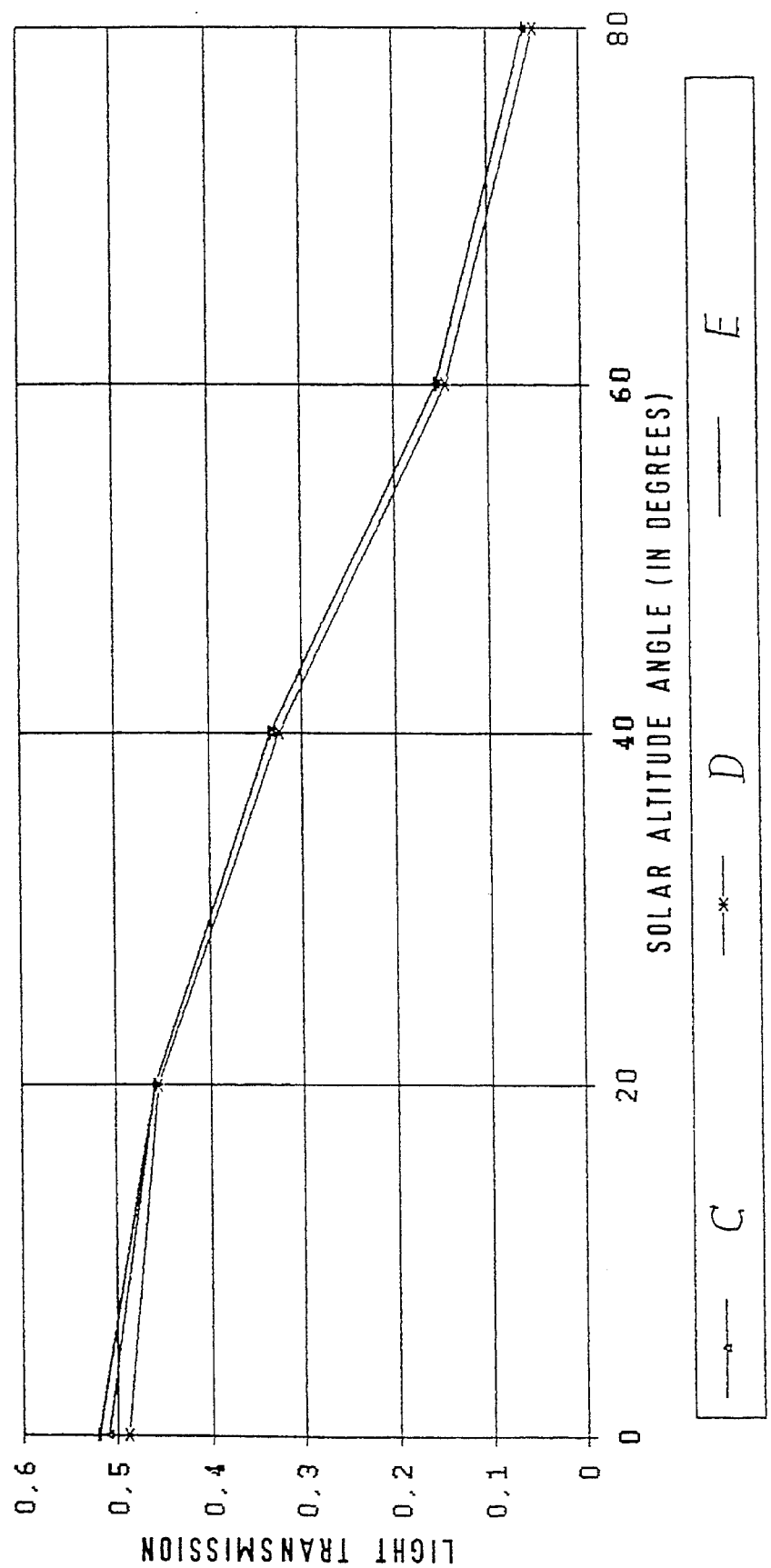
FIG. 3 is a graph similar to FIG. 2 showing the light transmission (transparency) when fillers in the form of flame-retardant substances are added, as a function of the solar altitude angle (angle of inclination)

FIG. 3 again illustrates the angular dependency of the filler substances. Three curves are shown which illustrate approximately identical conditions, specifically curve C for Exolith 462, curve D for Al(OH)$_3$; and curve E for Sandoflamm 5060. These curves also show the angular dependency effect of the substances that additionally improve the fire properties.

FIG. 4 shows that pigments that bring about a coloration and additionally generate a coloring effect are also suitable as fillers which lower the light transmission in the desired way when the angle of incidence of the light is steep. The decrease in transparency as the angle of incidence of light increases is shown for the use of Ös 153 blue (unsealed), specifically once, in curve F, for a proportion of 0.01%, and once, curve G, for a proportion of 0.1%.

I claim:

1. A composite thermal insulation system for a covering on a substantially planar upstanding building wall comprising:

a light absorbing outer wall layer having an inner side for attachment to said building wall and an outer side;

a layer of an at least partially light-transmissive thermal insulation material arranged on said outer side of said outer wall layer and having an outer side; and a substantially light-transmissive coating on said outer side of said layer of at least partially light-transmissive thermal insulation material comprising a coating containing at least 0.01% of an additive of powdered material having a particle size less than 5 μm and a refractive index between 1.45 and 1.65, so that the total light transmission value of the system in the summer season is less than 0.2 at high solar altitude angles greater than 60° to a vertical plane of said building wall.

2. The composite thermal insulation system as claimed in claim 1 wherein:

said additive of powdered material comprises a filler selected from the group consisting of quartzes, silica gels, aluminum silicate, magnesium silicate, and calcium carbonate.

3. The composite thermal insulation system as claimed in claim 1 wherein:

said additive of powdered material comprises a filler selected from the group consisting of compounds of phosphorous and nitrogen, halogenated compounds of phosphorous and nitrogen, and aluminum hydroxide.

4. The composite thermal insulation system as claimed in claim 1 wherein:

said additive of powdered material comprises transparent pigments so that said coating on said outer side of said outer wall layer has a coloring effect.

\* \* \* \* \*